(12) United States Patent
Takeuchi et al.

(10) Patent No.: US 12,536,771 B2
(45) Date of Patent: Jan. 27, 2026

(54) IMAGE PROCESSING METHOD, INFORMATION PROCESSING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventors: Kota Takeuchi, Azumino (JP); Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 314 days.

(21) Appl. No.: 18/327,145

(22) Filed: Jun. 1, 2023

(65) Prior Publication Data
US 2023/0394789 A1 Dec. 7, 2023

(30) Foreign Application Priority Data
Jun. 1, 2022 (JP) ................................ 2022-089549

(51) Int. Cl.
*G06V 10/75* (2022.01)
*H04N 5/74* (2006.01)

(52) U.S. Cl.
CPC ............. *G06V 10/758* (2022.01); *H04N 5/74* (2013.01); *G06V 2201/07* (2022.01)

(58) Field of Classification Search
CPC ..... G06V 10/758; G06V 2201/07; H04N 5/74
See application file for complete search history.

(56) References Cited

U.S. PATENT DOCUMENTS

| | | | |
|---|---|---|---|
| 2010/0209009 A1 | 8/2010 | Matsunaga | |
| 2012/0089364 A1 | 4/2012 | Takabayashi | |
| 2015/0207993 A1 | 7/2015 | Kato | |
| 2018/0359466 A1* | 12/2018 | Sugiura | H04N 17/04 |
| 2019/0130605 A1* | 5/2019 | Yu | G06T 7/55 |

FOREIGN PATENT DOCUMENTS

| | | |
|---|---|---|
| JP | 2009-253575 A | 10/2009 |
| JP | 2010-193058 A | 9/2010 |
| JP | 2012-103239 A | 5/2012 |
| JP | 2015-139118 A | 7/2015 |
| JP | 2019-168640 A | 10/2019 |

* cited by examiner

*Primary Examiner* — David Perlman
(74) *Attorney, Agent, or Firm* — Dority & Manning, P.A.

(57) ABSTRACT

An image processing method includes acquiring a first captured image that is produced by capturing an image of an object with an imaging device at first time and that contains a first point, acquiring a second captured image that is produced by capturing an image of the object with the imaging device at second time different from the first time and that contains a second point corresponding to the first point, and outputting first output information that is information for image processing based on at least one of the first and second captured images when a first indicator value generated based on the coordinates of the first point in the first captured image and the coordinates of the second point in the second captured image is smaller than or equal to a threshold.

15 Claims, 7 Drawing Sheets

IMAGE PROCESSING METHOD, INFORMATION PROCESSING APPARATUS, AND NON-TRANSITORY COMPUTER-READABLE STORAGE MEDIUM STORING PROGRAM

The present application is based on, and claims priority from JP Application Serial Number 2022-089549, filed Jun. 1, 2022, the disclosure of which is hereby incorporated by reference herein in its entirety.

BACKGROUND

1. Technical Field

The present disclosure relates to an image processing method, an information processing apparatus, and a non-transitory computer-readable storage medium storing a program.

2. Related Art

There have been developed technologies regarding a method for correcting the shape of an image projected from a projector, the position where the image is displayed, and other factors of the image. For example, JP-A-2009-253575 discloses a projector including a sensor that detects movement and a camera that captures images of an imaging target object. The projector evaluates whether to correct a projection image based on the difference between captured images stored in a storage and an image captured after the sensor detects the movement of the projector.

The projector described in JP-A-2009-253575 instructs the camera to capture images based on a signal output from the sensor, which detects movement. To this end, the projector needs to include the sensor and therefore has a problem of a complicated configuration.

SUMMARY

An image processing method according to an aspect of the present disclosure includes acquiring a first captured image that is produced by capturing an image of an object with an imaging device at first time and that contains a first point, acquiring a second captured image that is produced by capturing an image of the object with the imaging device at second time different from the first time and that contains a second point corresponding to the first point, and outputting first output information that is information for image processing based on at least one of the first and second captured images when a first indicator value generated based on coordinates of the first point in the first captured image and coordinates of the second point in the second captured image is smaller than or equal to a threshold.

An information processing apparatus according to another aspect of the present disclosure includes a processing apparatus, and the processing apparatus acquires a first captured image that is produced by capturing an image of an object with an imaging device at first time and that contains a first point, acquires a second captured image that is produced by capturing an image of the object with the imaging device at second time different from the first time and that contains a second point corresponding to the first point, and outputs first output information that is information for image processing based on at least one of the first and second captured images when a first indicator value generated based on coordinates of the first point in the first captured image and coordinates of the second point in the second captured image is smaller than or equal to a threshold.

A non-transitory computer-readable storage medium storing a program according to another aspect of the present disclosure causes a processing apparatus to acquire a first captured image that is produced by capturing an image of an object with an imaging device at first time and that contains a first point, acquire a second captured image that is produced by capturing an image of the object with the imaging device at second time different from the first time and that contains a second point corresponding to the first point, and output first output information that is information for image processing based on at least one of the first and second captured images when a first indicator value generated based on coordinates of the first point in the first captured image and coordinates of the second point in the second captured image is smaller than or equal to a threshold.

DESCRIPTION OF EXEMPLARY EMBODIMENTS

Figure 1:
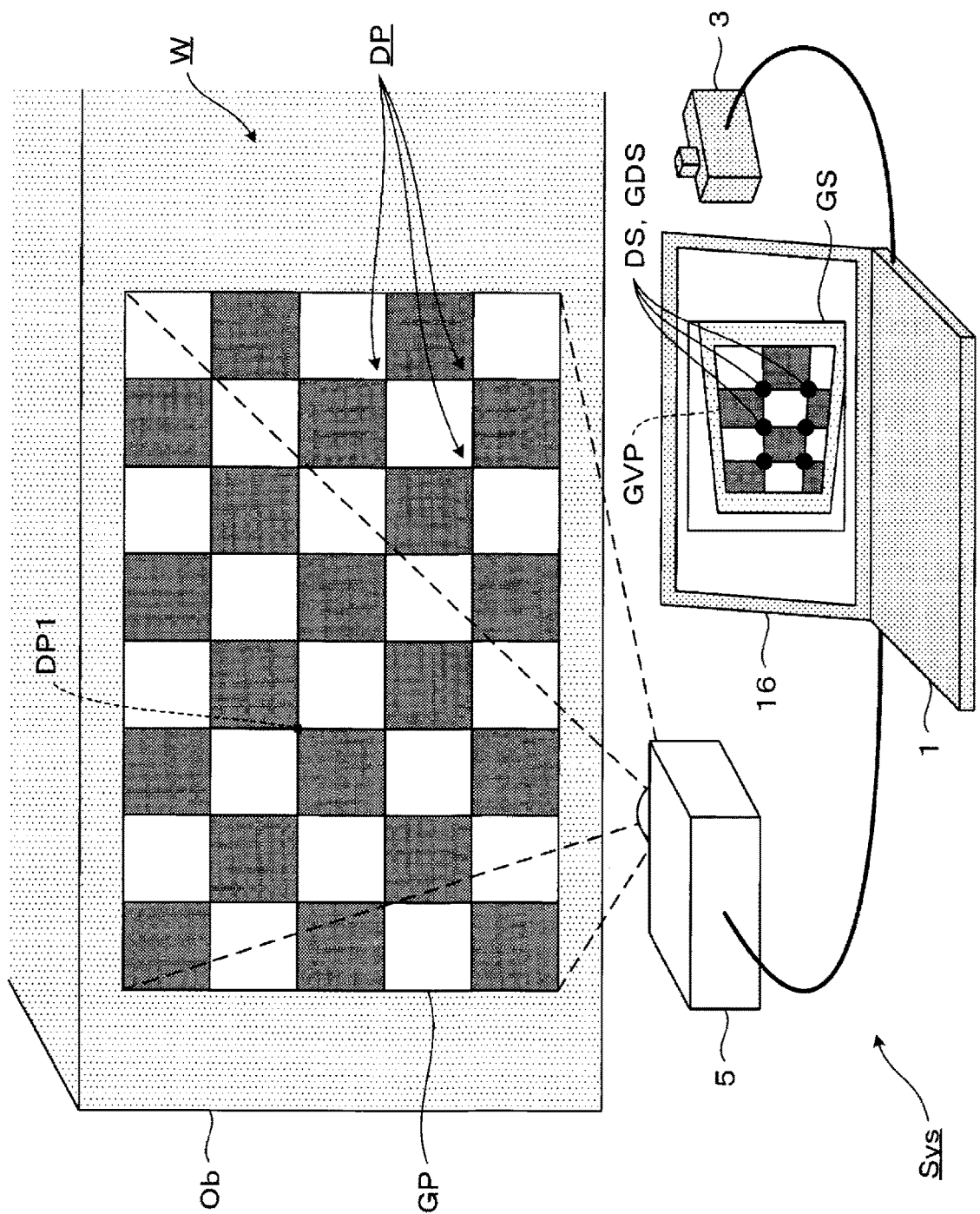
FIG. 1 is a diagrammatic view showing an image display system according to an embodiment.

A preferable embodiment according to the present disclosure will be described below with reference to the accompanying drawings. In the drawings, the dimensions and scale of each portion differ from actual values in some cases, and some of the portions are diagrammatically drawn for ease of understanding. The scope of the present disclosure is not limited to the embodiment unless particular restrictions on the present disclosure are made in the following description. In the present specification and the claims, when a numerical range is expressed by using "$\Phi$ to $\Psi$" ($\Phi$ and $\Psi$ are both numerical values), the range includes the numerical values of the upper limit ($\Psi$) and the lower limit ($\Phi$). The upper limit ($\Psi$) and the lower limit ($\Phi$) are expressed in the same unit.

1. Embodiment

In the embodiment, an image processing method, an information processing apparatus, and a program according to the present disclosure will be described by presenting by way of example an image display system including a projector that projects an image onto a wall surface of an object, a camera that captures an image of the wall surface at which the projection image is displayed, and a computer that outputs information for correcting the projection image based on the captured image acquired from the camera.

1.1. Overview of Image Display System

FIG. 1 is a diagrammatic view showing an image display system Sys according to the embodiment. The image display system Sys includes a projector 5, which displays a projection image GP on a wall surface W of an object Ob by projecting projection light, a camera 3, which captures an image of the wall surface W at which the projection image GP projected from the projector 5 has been displayed, and a computer 1, which outputs information for correcting the shape of the image projected from the projector 5, the position where the image is displayed, and other factors of the image based on a captured image GS acquired from the camera 3. The computer 1 is communicably connected to the camera 3 and the projector 5.

The projection image GP has a pattern formed of a plurality of black squares and a plurality of white squares alternately arranged. The projection image GP contains a plurality of points DP. In FIG. 1, the points DP are each a point located at the position where vertices of four squares coincide with one another, that is, a grid point. The plurality of points DP includes a point DP1. The pattern of the projection image GP is not limited to a black-and-white pattern, and may instead be a pattern drawn in two other colors. The pattern of the projection image GP is not limited to a pattern formed of squares alternately arranged, and can be any known pattern in which the point DP is detectable. The pattern of the projection image GP is preferably drawn in two high-contrast colors.

The camera 3 is disposed so as to face the wall surface W of the object Ob. The camera 3 acquires the captured image GS by capturing an image of the wall surface W at which the projection image GP has been displayed. The captured image GS contains an image GVP. The image GVP is an image representing the projection image GP. The image GVP contains a plurality of points DS. The plurality of points DS correspond in a one-to-one manner to the plurality of points DP contained in the projection image GP. The camera 3 repeatedly captures images of the wall surface W at which the projection image GP has been displayed, and sequentially outputs the acquired images GS to the computer 1. In the present embodiment, the camera 3 is not fixed and is placed on a flat surface such as a desk. That is, the camera 3 slightly moves in some cases due to unintended vibration caused, for example, by a user's contact with the desk.

The computer 1 acquires the captured image GS from the camera 3. The computer 1 detects the points DS by performing image processing on the captured image GS. The computer 1 displays the captured image GS on a display apparatus 16 provided in the computer 1. The computer 1 specifically displays the captured image GS on the display apparatus 16 with an image GDS, which shows the positions of the detected points DS, superimposed on the captured image GS. The computer 1 repeatedly acquires the captured image GS from the camera 3 and detects the points DS from each of the plurality of acquired captured images GS. Based on the coordinates of the plurality of detected points DS, the computer 1 evaluates whether the degree of difference between the plurality of captured images GS is sufficiently small. When the result of the evaluation shows that the degree of difference between the plurality of captured images GS is small, the computer 1 outputs information for correction of the shape of the image projected from the projector 5, the position where the image is displayed, and other factors of the image.

1.2. Configuration and Function of Image Display System

The configuration and function of the image display system Sys according to the embodiment will be described below with reference to FIGS. 2 to 9.

Figure 2:
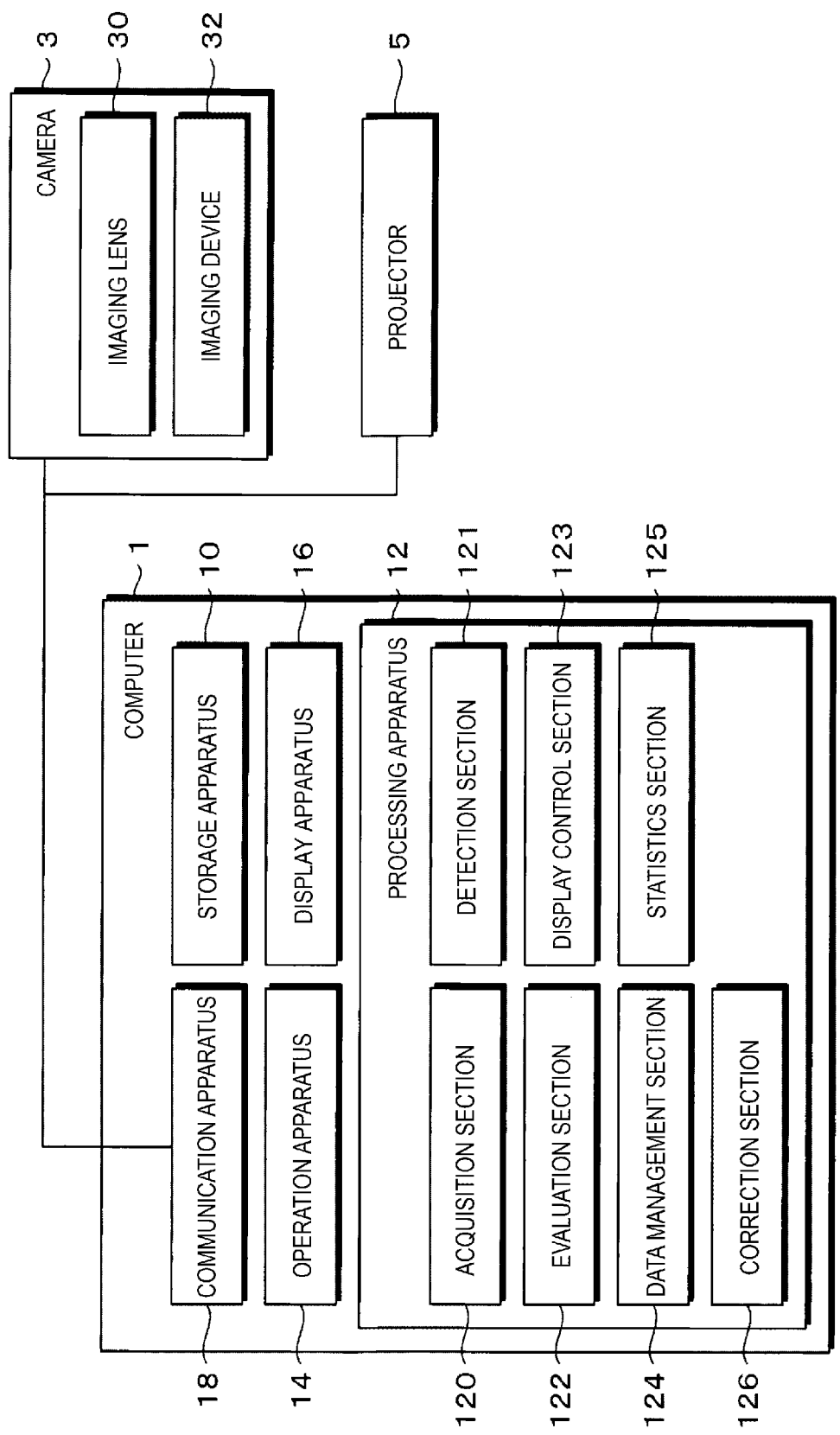
FIG. 2 is a block diagram showing the configuration of the image display system according to the embodiment.

FIG. 2 is a block diagram showing the configuration of the image display system Sys according to the embodiment. The computer 1 includes a storage apparatus 10, which stores a variety of types of information, a processing apparatus 12, which controls the actions of the computer 1, an operation apparatus 14, which accepts input operation from the user of the computer 1, the display apparatus 16, which displays an image, and a communication apparatus 18, which performs communication with the camera 3, the projector 5, an external storage apparatus, an external server, or any other apparatus. The processing apparatus 12 functions as an acquisition section 120, a detection section 121, an evaluation section 122, a display control section 123, a data management section 124, a statistics section 125, and a correction section 126. The camera 3 includes an imaging lens 30 and an imaging device 32.

The storage device 10 includes, for example, a volatile memory, such as a RAM, and a nonvolatile memory, such as a ROM. RAM is an abbreviation for a random access memory. ROM is an abbreviation for a read only memory.

Figure 3:
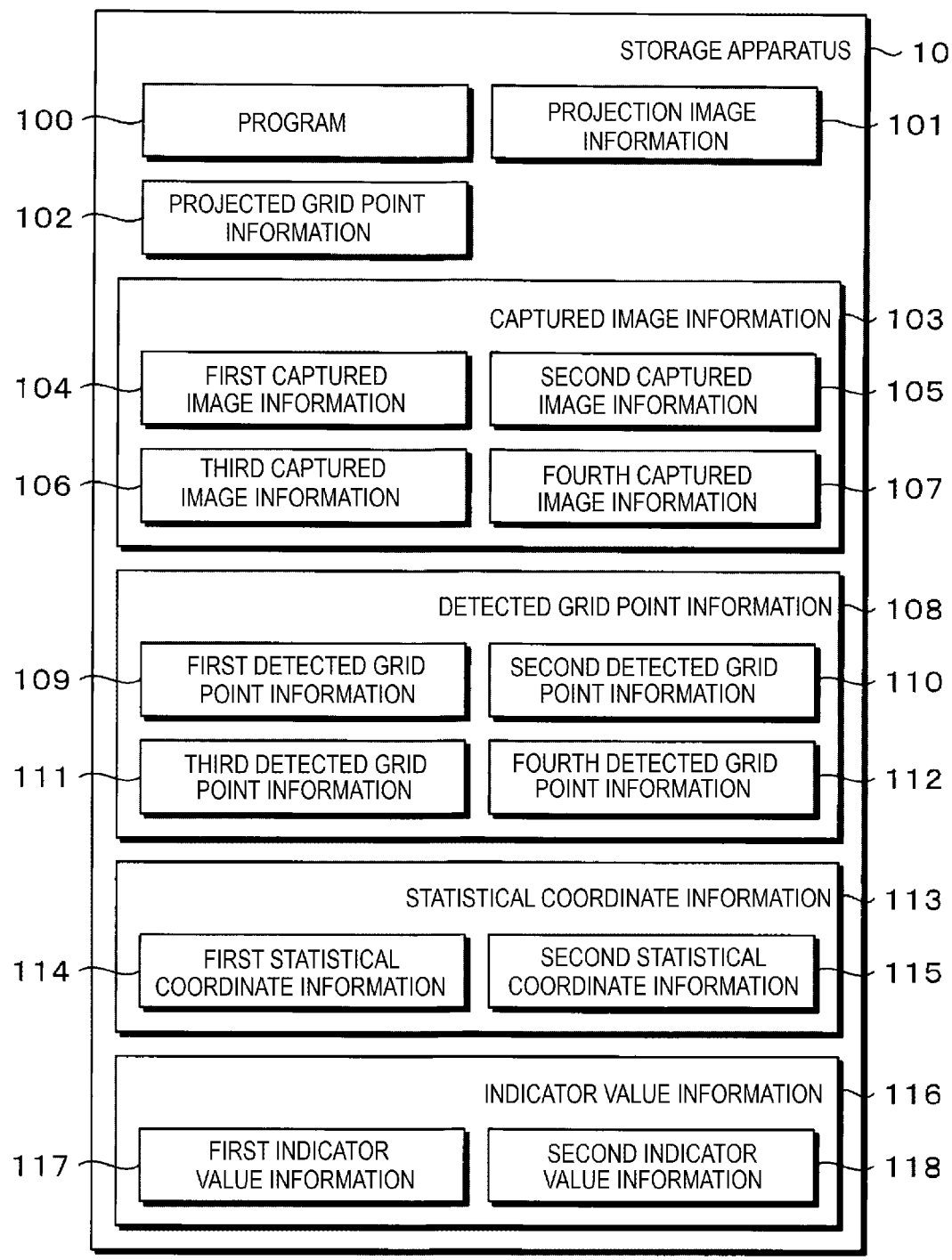
FIG. 3 is a block diagram showing the configuration of a storage apparatus according to the embodiment.

FIG. 3 is a block diagram showing the configuration of the storage apparatus 10 according to the embodiment. The nonvolatile memory provided in the storage apparatus 10 stores a program 100, which specifies the actions of the computer 1, projection image information 101 for forming projection light projected when the projector 5 displays the projection image GP, projected grid point information 102, which represents the arrangement, the number, and other factors of a plurality of points DF contained in an image GF, which will be described later, captured image information 103, which represents the captured images GS, detected grid point information 108, which represents the coordinates, the number, and other factors of the plurality of points DS detected from the captured images GS, statistical coordinate information 113, which is generated by statistical processing on the coordinates of the points DS detected from the plurality of captured images GS, and indicator value information 116, which represents a value that serves as an indicator in assessment of the degree of difference between the captured images GS. The captured image information 103 contains first captured image information 104, second captured image information 105, third captured image information 106, and fourth captured image information 107. The detected grid point information 108 contains first detected grid point information 109, second detected grid point information 110, third detected grid point information 111, and fourth detected grid point information 112. The statistical coordinate information 113 contains first statistical coordinate information 114 and second statistical coordinate information 115. The indicator value information 116 contains first indicator value information 117 and second indicator value information 118.

The volatile memory provided in the storage apparatus 10 is used by the processing apparatus 12 as a work area when the processing apparatus 12 executes the program 100.

A portion or the entirety of the storage apparatus 10 may be provided in the external storage apparatus, the external server, or any other component. A portion or the entirety of the variety of kinds of information stored in the storage apparatus 10 may be stored in the storage apparatus 10 in advance, or may be acquired from the external storage apparatus, the external server, or any other component.

Figure 4:
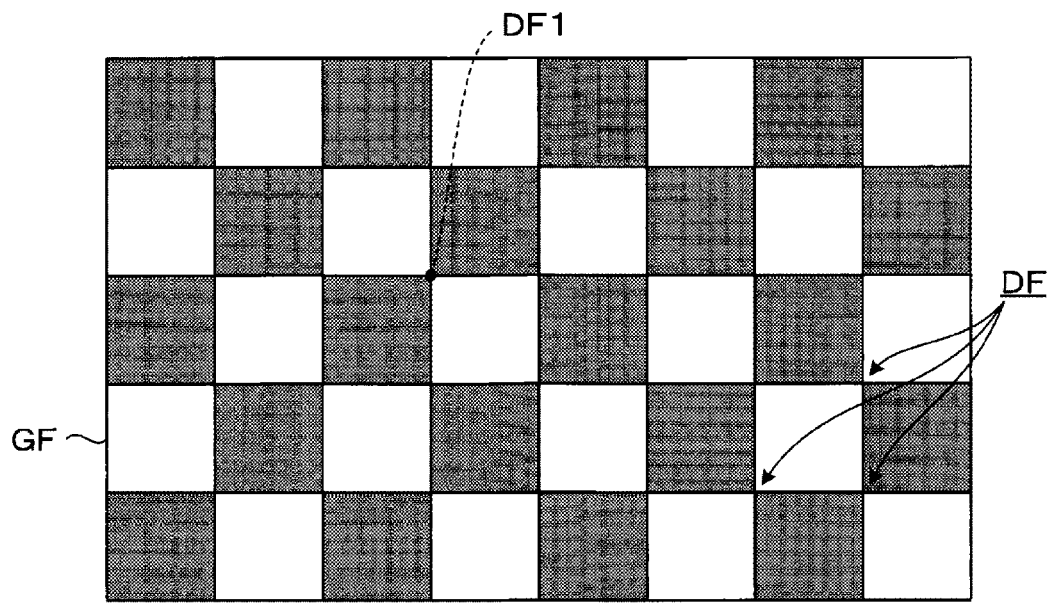
FIG. 4 is a diagrammatic view for describing an image.

FIG. 4 is a diagrammatic view for describing the image GF. The image GF is an image indicated by the projection image information 101. The image GF has a pattern formed of a plurality of black squares and a plurality of white squares alternately arranged. The image GF contains the plurality of points DF. In FIG. 4, the points DF are each a point located at the position where vertices of four squares coincide with one another, that is, a grid point. The plurality of points DF includes a point DF1.

The projector 5 acquires the projection image information 101 from the computer 1 and displays the projection image GP on the wall surface W by projecting the projection light formed based on the projection image information 101. That is, the image GF and the projection image GP have the same pattern. The plurality of points DF therefore correspond in a one-to-one manner to the plurality of points DP contained in the projection image GP. For example, the points DF1 and DP1 are points that are in correspondence with each other. The number of points DF contained in the image GF, the number of points DP contained in the projection image GP, and the number of points DS contained in each of the captured images GS coincide with one another.

Referring back to FIG. 2, the processing apparatus 12 includes one or more CPUs. It is, however, noted that the processing apparatus 12 may include a programmable logic device, such as an FPGA, in place of or in addition to the CPU. The CPU is an abbreviation for a central processing unit, and FPGA is an abbreviation for a field-programmable gate array.

The processing apparatus 12 functions as the acquisition section 120, the detection section 121, the evaluation section 122, the display control section 123, the data management section 124, the statistics section 125, and the correction section 126 shown in FIG. 2 by causing the CPU or any other component provided in the processing apparatus 12 to execute the program 100 and operate in accordance with the program 100.

The acquisition section 120 controls the communication apparatus 18 to acquire a variety of types of information from the camera 3, the projector 5, and an external terminal such as the external storage apparatus or the external server communicably connected to the computer 1. The acquisition section 120 causes the storage apparatus 10 to store the variety of types of acquired information. In the present embodiment, the acquisition section 120 acquires the captured image information 103 from the camera 3. The acquisition section 120 then causes the storage apparatus 10 to store the acquired captured image information 103.

The detection section 121 performs image processing on the captured images GS to detect the points DS contained in each of the captured images GS. For example, a known image processing technology such as pattern matching may be used in the function of detecting the points DS. No detailed technical description relating to the detection of the points DS will be made in the present specification.

The evaluation section 122 performs a variety of types of evaluation. For example, the evaluation section 122 evaluates whether all the points DS contained in each of the captured images GS have been detected based on the number of detected points DS, the coordinates of the detected points DS, and the projected grid point information 102.

The display control section 123 controls the display apparatus 16 to display the captured images GS. When all the points DS contained in each of the captured images GS are detected, the display control section 123 causes the display apparatus 16 to display the image GDS with the image GDS superimposed on the captured image GS. The image GDS is used to show the positions of the detected points DS, as described above. Specifically, the display control section 123 causes the display apparatus 16 to display the image GDS with the image GDS superimposed on the positions of the detected points DS.

The data management section 124 manages a variety of types of information. For example, the data management section 124 controls the storage apparatus 10 to store the detected grid point information 108, which represents the coordinates, the number, and other factors of the plurality of points DS detected from each of the captured images GS. The data management section 124 also controls the storage apparatus 10 to erase the stored detected grid point information 108.

The statistics section 125 performs the statistical processing on the coordinates of the points DS detected from each of the plurality of captured images GS.

The statistical processing in the image display system Sys according to the embodiment will be described below with reference to FIGS. 5 to 7.

In the following description, the origin and directions in each of the captured images GS are defined as follows: The origin is the top left vertex of the image; a direction parallel to the lengthwise direction of the captured image GS and oriented rightward from the origin toward the image is an X direction; and a direction parallel to the widthwise direction of the captured image GS and oriented downward from the origin is a Y direction. An axis extending from the origin in the X direction is defined as an X-axis, and an axis extending from the origin in the Y direction is defined as a Y-axis. The coordinates of a point in the captured image GS are denoted by (x, y). In the coordinates, the value x represents the X coordinate of the point in the captured image GS. In the coordinates, the value y represents the Y coordinate of the point in the captured image GS.

In the present embodiment, the statistical processing performed by the statistics section 125 is calculating the average of the X coordinates and the average of the Y coordinates of the points DS contained in the plurality of captured images GS, which are in correspondence with the points DP contained in the projection image GP. The statistical processing described above may be referred to as "averaging". For example, let $(x1_n, y1_n)$ be the coordinates of a point DS contained in the n-th one of N captured images GS and being in correspondence with the point DP1, and an average $a_{x1}$ of the X coordinates of the points DS contained in the N captured images GS and being in correspondence with the point DP1 is expressed by Expression (1) below.

$$a_{x1} = \frac{1}{N} \sum_{n=1}^{N} x1_n \tag{1}$$

In Expression (1), the value N is an integer greater than or equal to two. The value n is an integer that satisfies 1≤n≤N. Similarly, an average $a_{y1}$ of the Y coordinates of the points DS contained in the N captured images GS and being in correspondence with the point DP1 is expressed by Expression (2) below.

$$a_{y1} = \frac{1}{N} \sum_{n=1}^{N} y1_n \tag{2}$$

The statistical processing according to the present embodiment will be described below with reference to a case where N=2.

Figure 5:
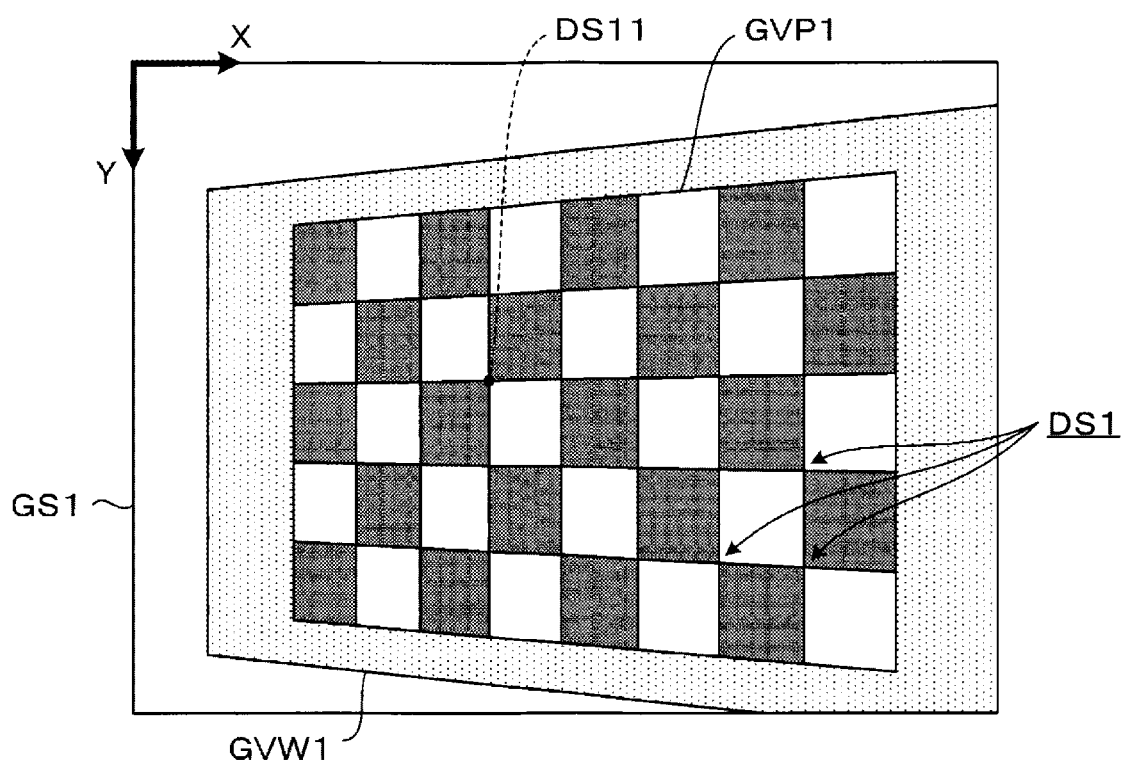
FIG. 5 is a diagrammatic view for describing a captured image.

FIG. 5 is a diagrammatic view for describing a captured image GS1. The captured image GS1 is an image indicated by the first captured image information 104. At time T1, the camera 3 acquires the captured image GS1 by capturing an image of the wall surface W at which the projection image GP is displayed with the imaging lens 30 and the imaging device 32. The captured image GS1 contains an image GVW1. The image GVW1 is an image representing the wall surface W. The image GVW1 contains an image GVP1. The image GVP1 is an image representing the projection image GP. The image GVP1 contains a plurality of points DS1. The plurality of points DS1 correspond in a one-to-one manner to the plurality of points DP contained in the projection image GP. The coordinates, the number, and other factors of the plurality of detected points DS1 are stored as the first detected grid point information 109 in the storage apparatus 10. The plurality of points DS1 includes a point DS11. The coordinates of the point DS11 are denoted by $(x1_1, y1_1)$ in the following description. The point DS11 is a point corresponding to the point DP1.

Figure 6:
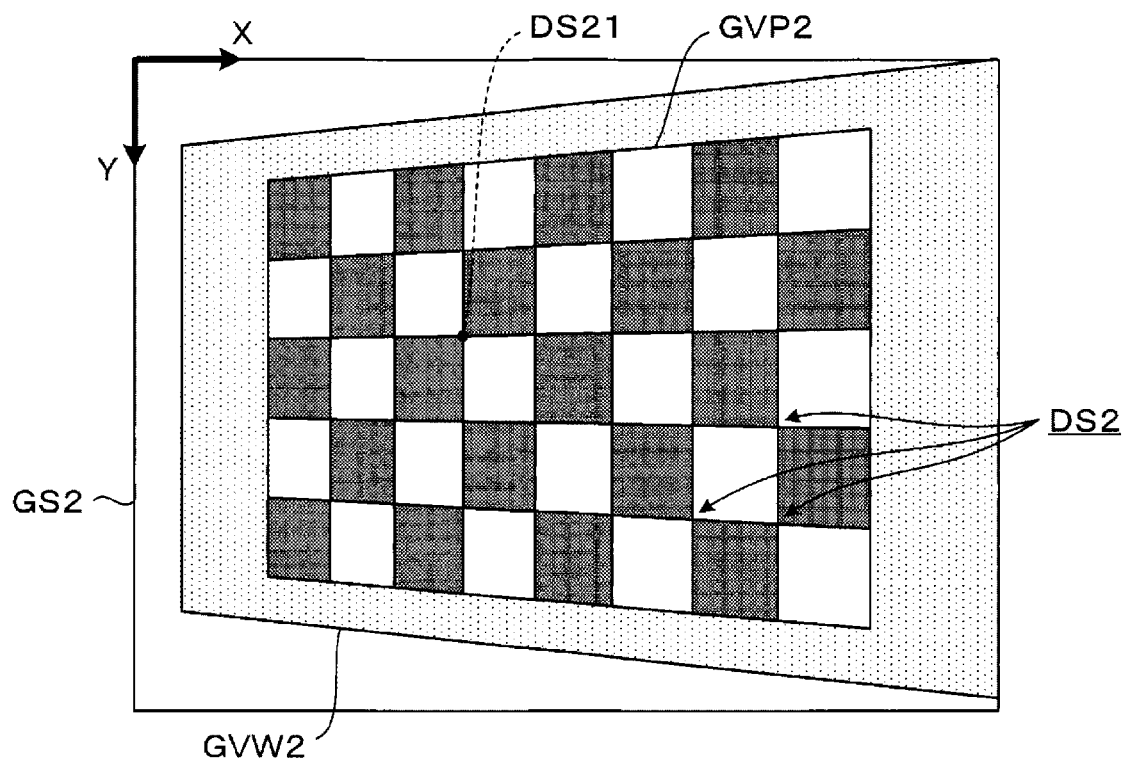
FIG. 6 is a diagrammatic view for describing another captured image.

FIG. 6 is a diagrammatic view for describing a captured image GS2. The captured image GS2 is an image indicated by the second captured image information 105. At time T2, the camera 3 acquires the captured image GS2 by capturing an image of the wall surface W at which the projection image GP is displayed with the imaging lens 30 and the imaging device 32. The captured image GS2 contains an image GVW2. The image GVW2 is an image representing the wall surface W. The image GVW2 contains an image GVP2. The image GVP2 is an image representing the projection image GP. The image GVP2 contains a plurality of points DS2. The plurality of points DS2 correspond in a one-to-one manner to the plurality of points DP contained in the projection image GP. The coordinates, the number, and other factors of the plurality of detected points DS2 are stored as the second detected grid point information 110 in the storage apparatus 10. The plurality of points DS2 includes a point DS21. The coordinates of the point DS21 are denoted by $(x1_2, y1_2)$ in the following description. The point DS21 is a point corresponding to the point DP1. That is, the point DS21 is a point corresponding to the point DS11.

Figure 7:
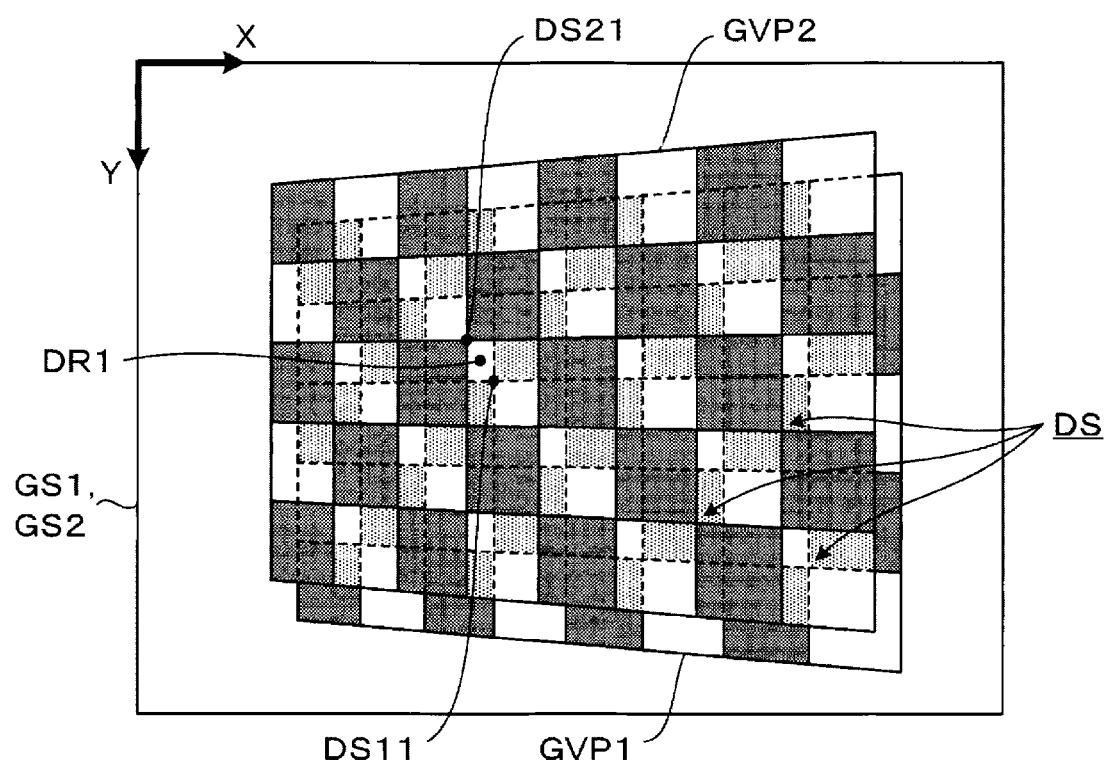
FIG. 7 is a diagrammatic view for describing statistical coordinates.

FIG. 7 is a diagrammatic view for describing statistical coordinates. Specifically, FIG. 7 shows that the captured image GS2 is superimposed on the captured image GS1. For convenience of the description, the images GVW1 and GVW2 are omitted in FIG. 7.

In the present embodiment, the coordinates indicated by the average of the X coordinates and the average of the Y coordinates produced by the statistical processing using the coordinates of the points DS contained in the plurality of captured images GS and being in correspondence with the points DP are referred to as the "statistical coordinates". A point DR1 is a point indicated by the statistical coordinates produced by the statistical processing using the coordinates of the point DS11 and the coordinates of the point DS21, which are in correspondence with the point DP1. That is, the coordinates of the point DR1 are $((x1_1+x1_2)/2, (y1_1+y1_2)/2)$ derived by substituting N=2 into Expressions (1) and (2) described above.

The statistical coordinate information 113 is information representing the statistical coordinates. The statistical processing is, in other words, generation of the statistical coordinate information 113 based on the coordinates of the points DS contained in the plurality of captured images GS and being in correspondence with the points DP. For example, the statistics section 125 generates the first statistical coordinate information 114 based on the coordinates of the point DS11 and the coordinates of the point DS21, which are in correspondence with the point DP1. The first statistical coordinate information 114 is information representing the coordinates of the point DR1.

The statistics section 125 performs the statistical processing multiple times equal to the number of points DP contained in the projection image GP. That is, the statistics section 125 performs the statistical processing using the coordinates of the plurality of points DS corresponding to the plurality of points DP contained in the projection image GP.

The statistics section 125 calculates the distance between the statistical coordinates and the coordinates of the points DS used in the statistical processing for determining the statistical coordinates. In the present embodiment, the distance is referred to as an "indicator value". The indicator value information 116 is information representing the indicator value. In other words, the statistics section 125 generates the indicator value information 116 based on the statistical coordinates and the coordinates of the points DS used in the statistical processing for determining the statistical coordinates.

For example, when the indicator value is calculated based on the statistical coordinates produced by the statistical processing using the coordinates of the points DS contained in the N captured images GS and being in correspondence with the point DP1, and the coordinates of the points DS used in the statistical processing for determining the statistical coordinates, N indicator values are produced in total. An index value $d1_n$ calculated based on the statistical coordinates and the coordinates of the point DS contained in the n-th one of the N captured images GS and being in correspondence with the point DP1 is expressed by Expression (3) shown below.

$$d1_n = \sqrt{(x1_n - a_{x1})^2 + (y1_n - a_{y1})^2} \qquad (3)$$

When N=2, the point indicated by the statistical coordinates is the midpoint of a line segment having two end points used in the statistical processing, so that the two indicator values produced based on the statistical coordinates are equal to each other. That is, an indicator value $d1_1$ calculated based on the coordinates of the point DS11 and the coordinates of the point DR1, and an indicator value $d1_2$ calculated based on the coordinates of the point DS21 and the coordinates of the point DR1 are equal to each other. The first indicator value information 117 is information representing the indicator value $d1_2$ and the indicator value $d1_1$.

Based on the indicator values, the processing apparatus 12 evaluates whether the degree of difference between the plurality of captured images GS is sufficiently small. When the result of the evaluation shows that the degree of difference between the plurality of captured images GS is large, the processing apparatus 12 erases the detected grid point information 108 stored in the storage apparatus 10 and acquires the captured image information 103 from the camera 3 again.

Figure 8:
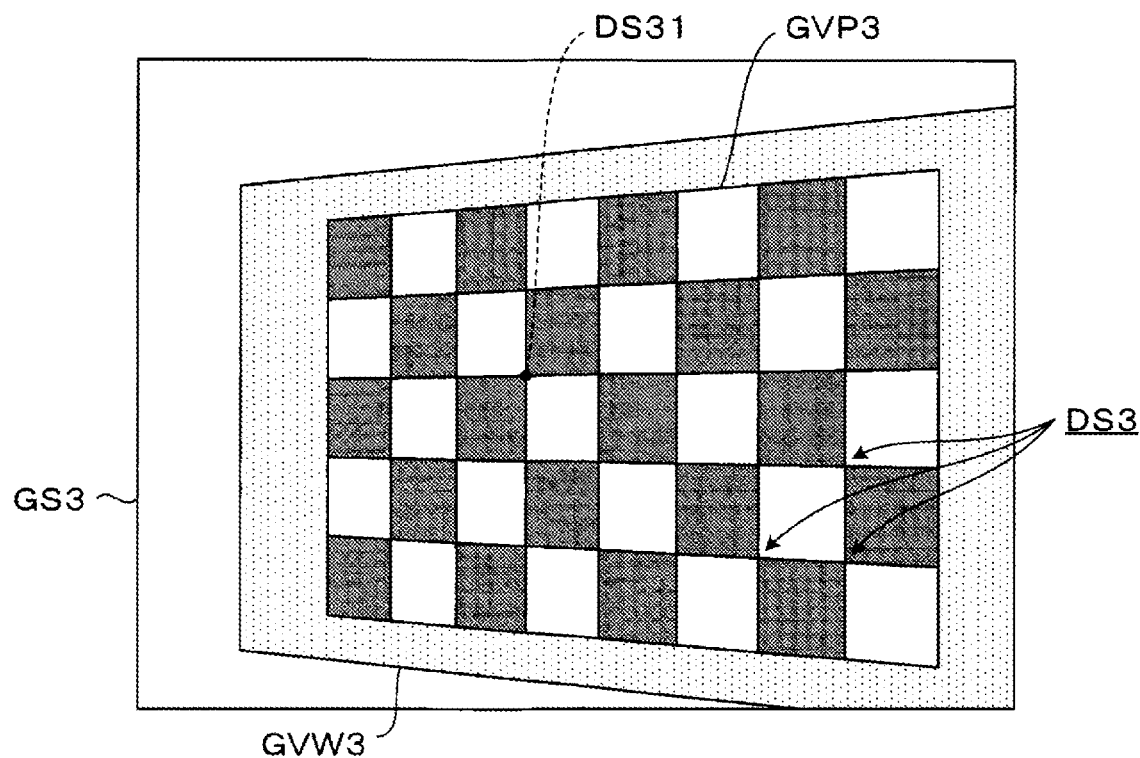
FIG. 8 is a diagrammatic view for describing another captured image.

FIG. 8 is a diagrammatic view for describing a captured image GS3. The captured image GS3 is an image indicated by the third captured image information 106. At time T3, the camera 3 acquires the captured image GS3 by capturing an image of the wall surface W on which the projection image GP is displayed with the imaging lens 30 and the imaging device 32. The captured image GS3 contains an image GVW3. The image GVW3 is an image representing the wall surface W. The image GVW3 contains an image GVP3. The image GVP3 is an image representing the projection image GP. The image GVP3 contains a plurality of points DS3. The plurality of points DS3 correspond in a one-to-one manner to the plurality of points DP contained in the projection image GP. The coordinates, the number, and other factors of the plurality of detected points DS3 are stored as the third detected grid point information 111 in the storage apparatus 10. The plurality of points DS3 includes a point DS31. The coordinates of the point DS31 are denoted by $(x1_3, y1_3)$ in the following description. The point DS31 is a point corresponding to the point DP1. That is, the point DS31 is a point corresponding to the points DS11 and DS21.

Figure 9:
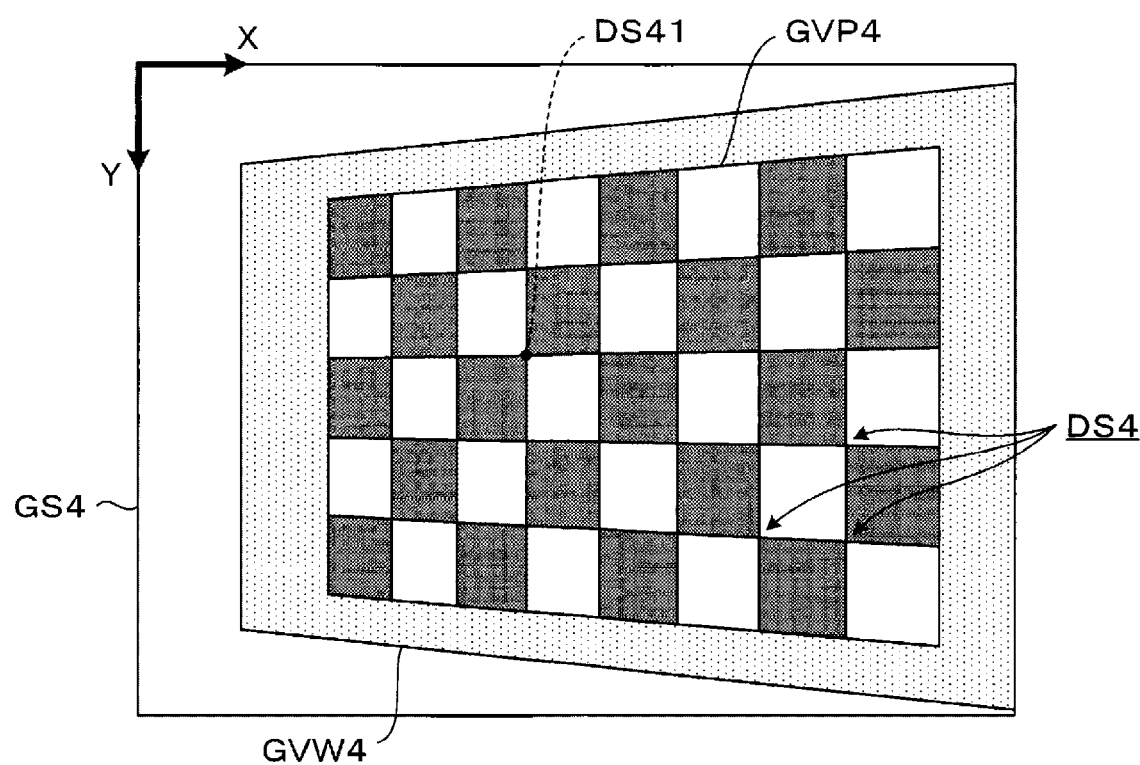
FIG. 9 is a diagrammatic view for describing another captured image.

FIG. 9 is a diagrammatic view for describing a captured image GS4. The captured image GS4 is an image indicated by the fourth captured image information 107. At time T4, the camera 3 acquires the captured image GS4 by capturing an image of the wall surface W on which the projection image GP is displayed with the imaging lens 30 and the imaging device 32. The captured image GS4 contains an image GVW4. The image GVW4 is an image representing the wall surface W. The image GVW4 contains an image GVP4. The image GVP4 is an image representing the projection image GP. The image GVP4 contains a plurality of points DS4. The plurality of points DS4 correspond in a one-to-one manner to the plurality of points DP contained in the projection image GP. The coordinates, the number, and other factors of the plurality of detected points DS4 are stored as the fourth detected grid point information 112 in the storage apparatus 10. The plurality of points DS4 includes a point DS41. The coordinates of the point DS41 are denoted by $(x1_4, y1_4)$ in the following description. The point DS41 is a point corresponding to the point DP1. That is, the point DS41 is a point corresponding to the points DS11, DS21, and DS31.

When the result of the evaluation shows that the degree of difference between the plurality of captured images GS is large, the processing apparatus 12 detects the points DS from the captured images GS3 and GS4. The processing apparatus 12 generates the statistical coordinate information 113 based on the plurality of detected points DS. The processing apparatus 12 further generates the indicator value information 116 based on the statistical coordinates indicated by the statistical coordinate information 113 and the coordinates of the points DS used in the statistical processing for determining the statistical coordinates. For example, the processing apparatus 12 generates the second statistical coordinate information 115 based on the coordinates of the point DS31 and the coordinates of the point DS41. The second statistical coordinate information 115 is information representing the statistical coordinates produced by the statistical processing using the coordinates of the point DS31 and the coordinates of the point DS41. The processing apparatus 12 further generates the second indicator value information 118 based on the statistical coordinates indicated by the second statistical coordinate information 115 and the coordinates of the point DS41. The second indicator value information 118 is information representing the distance between the statistical coordinates indicated by the second statistical coordinate information 115 and the coordinates of the point DS41.

When the result of the evaluation shows that the degree of difference between the plurality of captured images GS is small, the processing apparatus 12 outputs information representing the coordinates of the points contained in each of the captured images GS. When the output information is information based on at least one of the captured images GS1 and GS2, the information may be referred to as "first output information". When the output information is information based on at least one of the captured images GS3 and GS4, the information may be referred to as "second output information". The first output information and the second output information are each information used to correct the shape of the projection image GP and the position where the projection image GP is displayed.

In the present embodiment, the statistical coordinate information 113 is output as information representing the coordinates of each of the points contained in each of the captured images GS. The information to be output is not limited to the statistical coordinate information 113, and may, for example, be the detected grid point information 108. In the present embodiment, the output information is stored in the storage apparatus 10.

Returning back to FIG. 2, the correction section 126 deforms the shape of the image GF by editing the projection image information 101. The projector 5 then acquires the projection image information 101 edited by the correction section 126 from the computer 1 and deforms the shape of the projection image GP displayed on the wall surface W by projecting the projection light formed based on the edited projection image information 101. That is, the correction section 126 corrects the shape of the projection image GP displayed on the wall surface W. The correction section 126 can correct the shape of any image projected from the projector 5 onto the wall surface W as well as the shape of the projection image GP. In the present embodiment, the correction section 126 corrects the shape of the projection image GP based on the statistical coordinate information 113.

The operation apparatus 14 is an input interface that accepts input operation performed on the computer 1 from the user of the computer 1. The operation apparatus 14 is, for example, a keyboard or a pointing device provided as a portion of the computer 1. For example, when the operation apparatus 14 includes a keyboard, the operation apparatus 14 outputs data that identifies a pressed button to the processing apparatus 12. The content of the input operation performed on the computer 1 is thus transmitted to the processing apparatus 12.

The display apparatus 16 includes a display panel for displaying an image. The display apparatus 16 displays an image by controlling a plurality of pixel circuits provided in the display apparatus 16 under the control of the display control section 123. For example, when the display apparatus 16 includes a liquid crystal panel, the plurality of pixel circuits each include a liquid crystal device, and displays an image by adjusting the transmittance at which the liquid crystal device transmits light emitted from a backlight. On the other hand, when the display apparatus 16 includes an organic EL panel, the plurality of pixel circuits each include a light emitting device, and displays an image by adjusting the magnitude of the light emitted from the light emitting device. EL is an abbreviation for electro-luminescence.

The communication apparatus 18 includes, for example, an interface substrate including a connector and an interface circuit, and has the function of receiving a variety of kinds of information from the external terminal, the external storage apparatus, the external server, or any other component and the function of transmitting a variety of kinds of information to the external terminal, the external storage apparatus, the external server, or any other component. In the present embodiment, the communication apparatus 18 is communicatively coupled to the camera 3 and the projector 5, and transmits and receives a variety of types of information to and from the camera 3 and the projector 5.

The camera 3 includes the imaging lens 30, which collects light, and the imaging device 32, which converts the collected light into an electric signal. The imaging device 32 is, for example, an image sensor, such as a CCD or a CMOS device. CCD is an abbreviation for a charge coupled device, and CMOS is an abbreviation for complementary metal oxide semiconductor. The camera 3 acquires the captured images GS by capturing an image of the wall surface W at which the projection image GP has been displayed. The camera 3 outputs the captured image information 103 representing the acquired captured images GS to the computer 1.

The projector 5 includes a light source apparatus including a halogen lamp, a xenon lamp, an ultrahigh-pressure mercury lamp, an LED, a laser light source, or any other light source, a light modulator that generates image light, and a projection system that projects the image light. The light modulator includes a DMD, a liquid crystal panel, or any other component. The projection system includes a projection lens. LED is an abbreviation for light emitting diode, and DMD is an abbreviation for digital mirror device. The projector 5 displays the projection image GP on the wall surface W by projecting the projection light formed based on the projection image information 101.

1.3. Actions of Computer

Figure 10:
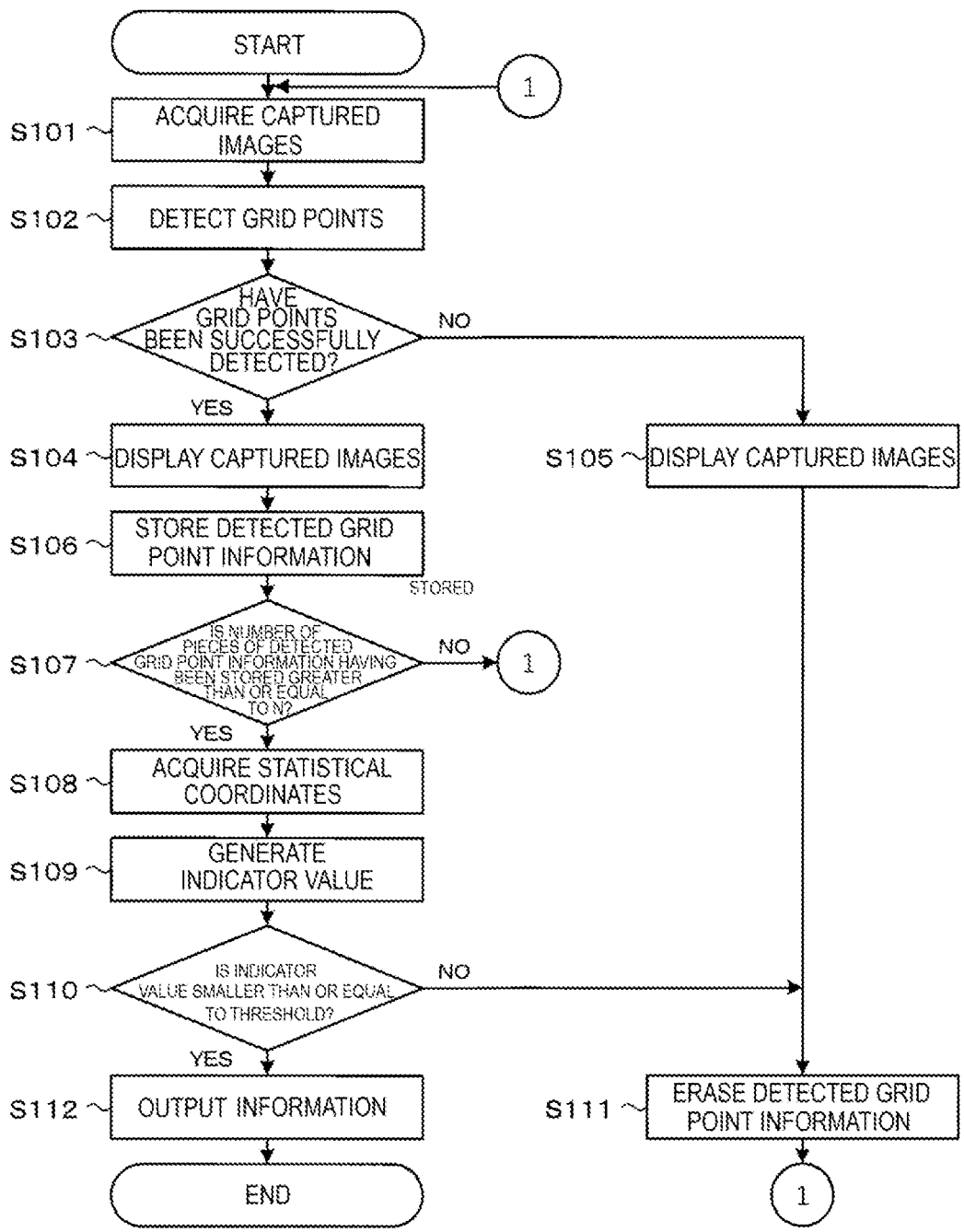
FIG. 10 is a flowchart for describing the actions of a computer according to the embodiment.

FIG. 10 is a flowchart for describing the actions of the computer 1 according to the embodiment. A series of actions shown in the flowchart of FIG. 10 starts, for example, when the computer 1 is powered on and accepts input operation relating to the start of the actions from the user. It is assumed that the projector 5 is displaying the projection image GP on the wall surface W while the series of actions shown in the flowchart of FIG. 10 are executed. That is, the projection image information 101 is output from the computer 1 to the projector 5 in advance before the series of actions shown in the flowchart of FIG. 10 are executed.

In step S101, the acquisition section 120 acquires the captured image information 103 from the camera 3 by controlling the communication apparatus 18. In other words, the acquisition section 120 acquires the captured images GS from the camera 3 by controlling the communication apparatus 18. The acquisition section 120 then causes the storage apparatus 10 to store the acquired captured image information 103.

In step S102, the detection section 121 performs image processing on the captured images GS indicated by the captured image information 103 to detect the points DS, which are the grid points contained in each of the captured images GS.

In step S103, the evaluation section 122 evaluates whether the grid points have been successfully detected. Specifically, the evaluation section 122 evaluates whether all the points DS contained in each of the captured images GS have been detected based on the number of detected points DS, the coordinates of the detected points DS, and the projected grid point information 102. When all the points DS contained in each of the captured images GS are detected, that is, when the result of step S103 is YES, the evaluation section 122 proceeds to the process in step S104. When all the points DS contained in any of the captured images GS are not detected, that is, when the result of step S103 is NO, the evaluation section 122 proceeds to the process in step S105.

In step S104, the display control section 123 controls the display apparatus 16 to display each of the captured images GS. The display control section 123 causes the display apparatus 16 to display the image GDS, which shows the positions of the detected points DS, with the image GDS superimposed on the positions of the detected points DS.

In step S105, the display control section 123 controls the display apparatus 16 to display each of the captured images GS.

When all the points DS contained in any of the captured images GS are not detected, the display control section 123 causes the display apparatus 16 to display the captured image GS with the image GDS not superimposed.

In step S106, the data management section 124 controls the storage apparatus 10 to store the detected grid point information 108, which represents the coordinates, the number, and other factors of the plurality of points DS detected from each of the captured images GS.

In step S107, the evaluation section 122 evaluates whether the number of pieces of detected grid point information 108 stored in the storage apparatus 10 is greater than or equal to N. When the number of pieces of detected grid point information 108 stored in the storage apparatus 10 is greater than or equal to N, that is, when the result of step S107 is YES, the evaluation section 122 proceeds to the process in step S108. When the number of pieces of detected grid point information 108 stored in the storage apparatus 10 is smaller than N, that is, when the result of step S107 is NO, the evaluation section 122 proceeds to the process in step S101.

Until the number of captured images GS required to acquire the statistical coordinates is reached, the processing apparatus 12 acquires the captured image information 103 from the camera 3, and detects the points DS from each of the captured images GS indicated by the captured image information 103. For example, when the coordinates of the plurality of points DS contained in two captured images GS are used to perform the statistical processing, N=2 is satisfied.

In step S108, the statistics section 125 performs the statistical processing on the coordinates of the points DS detected from the N captured images GS. That is, the statistics section 125 acquires the statistical coordinate information 113 based on the coordinates of the points DS contained in the N captured images GS and being in correspondence with the points DP.

In step S109, the statistics section 125 generates the indicator value information 116 based on the statistical coordinates indicated by the statistical coordinate information 113 and the coordinates of the points DS used in the statistical processing for determining the statistical coordinates.

In step S110, the evaluation section 122 evaluates whether the indicator value indicated by the indicator value information 116 is smaller than or equal to a threshold. When the indicator value indicated by the indicator value information 116 is smaller than or equal to the threshold, that is, when the result of step S110 is YES, the evaluation section 122 proceeds to the process in step S112. When the indicator value indicated by the indicator value information 116 is greater than the threshold, that is, when the result of step S110 is NO, the evaluation section 122 proceeds to the process in step S111.

When the indicator value indicated by the indicator value information 116 is smaller than or equal to the threshold, it is regarded that the degree of the difference between the plurality of captured images GS is sufficiently small. When the indicator value indicated by the indicator value information 116 is greater than the threshold, it is regarded that the degree of difference between the plurality of captured images GS is large. When N=2 and the points DS are detected from the captured images GS1 and GS2, the evaluation section 122 evaluates whether the indicator value indicated by the first indicator value information 117 is smaller than or equal to the threshold. When N=2 and the points DS are detected from the captured images GS3 and GS4, the evaluation section 122 evaluates whether the indicator value indicated by the second indicator value information 118 is smaller than or equal to the threshold. For example, 3 pixels or any other suitable value is set as the threshold used in the evaluation in step S110.

In step S111, the data management section 124 controls the storage apparatus 10 to erase the detected grid point information 108 stored in the storage apparatus 10.

When the result of the evaluation in step S103 is NO, the captured image GS is likely to be blurred, for example, because the camera 3 has moved greatly when capturing an image of the projection image GP. When the result of the evaluation in step S110 is NO, the degree of difference between the plurality of captured images GS is large, so that it is possible that the camera 3 has moved or the direction in which the projector 5 projects light has changed before the captured images GS are acquired. In such cases, the computer 1 resets the detected grid point information 108 stored in the storage apparatus 10 and acquires the captured image information 103 again from the camera 3.

In step S112, the data management section 124 outputs the statistical coordinate information 113. The data management section 124 controls the storage apparatus 10 to store the statistical coordinate information 113.

When the statistical coordinate information 113 output in step S112 contains the first statistical coordinate information 114, the first statistical coordinate information 114 is the first output information. When the statistical coordinate information 113 output in step S112 contains the second statistical coordinate information 115, the second statistical coordinate information 115 is the second output information.

After the process in step S112 is carried out, the processing apparatus 12 terminates the series of actions shown in the flowchart of FIG. 10.

When the series of actions shown in the flowchart of FIG. 10 is terminated, the correction section 126 corrects the shape of the projection image GP displayed on the wall surface W by editing the projection image information 101 based on the statistical coordinate information 113. That is, when the first output information is output, the correction section 126 corrects the shape of the projection image GP displayed on the wall surface W by editing the projection image information 101 based on the first output information. When the second output information is output, the correction section 126 corrects the shape of the projection image GP displayed on the wall surface W by editing the projection image information 101 based on the second output information.

As described above, according to the embodiment, the computer 1 can evaluate whether the degree of difference between the plurality of captured images GS is sufficiently small based on the coordinates of the points DS detected from the plurality of captured images GS. That is, the computer 1 can precisely correct the shape of the projection image GP based on the coordinates of the points DS detected when the degree of difference between the plurality of captured images GS is sufficiently small, in other words, when the image capturing operation is performed with high precision.

According to the embodiment, the image display system Sys can correct the projection image GP even when the computer 1, the camera 3, and the projector 5 are separate from each other. Furthermore, the image display system Sys can correct the projection image GP without use of sensors that detect movement of the projector 5 and the camera 3. That is, since the sensors can be omitted from the image display system Sys, the configuration of the system can be simplified, whereby the manufacturing cost of the system as a product can be reduced. Since the image display system Sys can correct the projection image GP based on the captured images GS without using any sensor, the shape of the projection image GP can be appropriately corrected even when a difference is created between the plurality of captured images GS due, for example, to movement of the object Ob, which an imaging target object.

As described above, the image processing method according to the embodiment includes acquiring the captured image GS1 that is produced by capturing an image of the object Ob with the imaging device 32 at the time T1 and that contains the point DS11, acquiring the captured image GS2 that is produced by capturing an image of the object Ob with the imaging device 32 at the time T2 different from the time T1 and that contains the point DS21 corresponding to the point DS11, and outputting the first output information, which is information for image processing, based on at least one of the captured image GS1 and the captured image GS2 when the indicator value $d1_2$ generated based on the coordinates of the point DS11 in the captured image GS1 and the coordinates of the point DS21 in the captured image GS2 is smaller than or equal to the threshold.

The computer 1 according to the embodiment includes the processing apparatus 12, and the processing apparatus 12 acquires the captured image GS1 that is produced by capturing an image of the object Ob with the imaging device 32 at the time T1 and that contains the point DS11, acquires the captured image GS2 that is produced by capturing an image of the object Ob with the imaging device 32 at the time T2 different from the time T1 and that contains the point DS21 corresponding to the point DS11, and outputs the first output information, which is information for image processing, based on at least one of the captured image GS1 and the captured image GS2 when the indicator value $d1_2$ generated based on the coordinates of the point DS11 in the captured image GS1 and the coordinates of the point DS21 in the captured image GS2 is smaller than or equal to the threshold.

The program 100 according to the embodiment causes the processing apparatus 12 to acquire the captured image GS1 that is produced by capturing an image of the object Ob with the imaging device 32 at the time T1 and that contains the point DS11, acquire the captured image GS2 that is produced by capturing an image of the object Ob with the imaging device 32 at the time T2 different from the time T1 and that contains the point DS21 corresponding to the point DS11, and output the first output information, which is information for image processing, based on at least one of the captured image GS1 and the captured image GS2 when the indicator value $d1_2$ generated based on the coordinates of the point DS11 in the captured image GS1 and the coordinates of the point DS21 in the captured image GS2 is smaller than or equal to the threshold.

That is the image processing method, the computer 1, and the program 100 according to the present embodiment each selectively use the plurality of captured images GS captured when the degree of difference between the captured images GS is small, in other words, when the image capturing operation is performed with high precision to acquire and output information for performing image correction. The image display system Sys can thus output information for the image processing without use of a sensor or other special device that detects movement, and can therefore perform the image correction in a simple system configuration.

In the present embodiment, the time T1 is an example of the "first time", the imaging device 32 is an example of the "imaging device", the object Ob is an example of the "object", the point DS11 is an example of the "first point", the captured image GS1 is an example of the "first captured image", the time T2 is an example of the "second time", the point DS21 is an example of the "second point", the captured image GS2 is an example of the "second captured image", the indicator value $dl_2$ is an example of the "first indicator value", the captured images GS are an example of the "captured images", the computer 1 is an example of the "information processing apparatus", the program 100 is an example of the "program", and the processing apparatus 12 is an example of the "processing apparatus". The "first output information" is an example of the first statistical coordinate information 114.

In the image processing method according to the embodiment, the object Ob has the wall surface W, on which the projection image GP projected from the projector 5 is displayed, the projection image GP contains the point DP1 corresponding to the points DS11 and DS21, and the first output information represents the coordinates of one or more points contained in each of the captured images GS.

That is, the configuration in which the projection image GP contains the point DP1 corresponding to the points DS11 and DS21 allows the computer 1 to grasp the correspondence between the points DS contained in each of the captured images GS and the points DP contained in the projection image GP. The computer 1 can thus accurately evaluate whether the points DS have been successfully detected.

The computer 1 further uses the captured images GS of the wall surface W on which the projection image GP projected from the projector 5 is displayed to evaluate the magnitude of the degree of difference between the plurality of captured images GS. The computer 1 can thus detect a change in the captured images GS due to movement of the camera 3, a change in the captured images GS due to movement of the projector 5, and a change in the captured images GS due to movement of the object Ob having the wall surface W. The computer 1 can therefore further detect a change in the captured images GS due to a factor other than movement of the projector 5, and can therefore prevent a decrease in precision of the acquisition of the captured images GS.

In the present embodiment, the projector 5 is an example of the "projector", the projection image GP is an example of the "projection image", the wall surface W is an example of the "display surface", and the point DP1 is an example of the "third point". The "one or more points" are an example of the point DR1.

In the image processing method according to the embodiment, the indicator value $dl_2$ is generated based on the coordinates of the point DR1 produced by the statistical processing using the coordinates of the point DS11 and the coordinates of the point DS21, and the coordinates of the point DS21.

That is, the computer 1 determines a criterion used in the assessment of the degree of difference between the plurality of captured images GS based on the statistical processing using the coordinates of the points contained in the captured images GS, which are the target of the assessment. The computer 1 can therefore appropriately set the criterion used in the assessment of the degree of difference between the plurality of captured images GS, and hence perform accurate assessment.

In the present embodiment, the coordinates of the point DR1 are an example of the "statistical coordinates".

In the image processing method according to the embodiment, the statistical processing is averaging using the coordinates of the point DS11 and the coordinates of the point DS21.

The computer 1 can therefore set the assessment criterion appropriately even when there are two captured images GS to be assessed for the degree of difference.

The image processing method according to the embodiment further includes, when the indicator value $dl_2$ is greater than the threshold, erasing the first detected grid point information 109 and the second detected grid point information 110, acquiring the captured image GS3 that is produced by capturing an image of the object Ob with the imaging device 32 at the time T3 different from the time T1 and the time T2 and that contains the point DS31, acquiring the captured image GS4 that is produced by capturing an image of the object Ob with the imaging device 32 at the time T4 different from the time T1, the time T2, and the time T3 and that contains the point DS41 corresponding to the point DS31, and outputting the second output information, which is information for image processing, based on at least one of the captured image GS3 and the captured image GS4 when the indicator value indicated by the second indicator value information 118 generated based on the coordinates of the point DS31 in the captured image GS3 and the coordinates of the point DS41 in the captured image GS4 is smaller than or equal to the threshold.

That is, when the degree of difference between the plurality of captured images GS is not small, in other words, when the image capturing operation is not performed with high precision, the computer 1 erases the information representing the coordinates of the detected points and acquires captured images again. The computer 1 can therefore acquire and output information for performing the image correction by always using the captured images GS produced when the image capturing operation is performed with high precision.

In the present embodiment, the first detected grid point information 109 is an example of the "information representing the coordinates of the first point", the second detected grid point information 110 is an example of the "information representing the coordinates of the second point", the time T3 is an example of the "third time", the point DS31 is an example of the "fourth point", the captured image GS3 is an example of the "third captured image", the time T4 is an example of the "fourth time", the point DS41 is an example of the "fifth point", the captured image GS4 is an example of the "fourth captured image", and the indicator value indicated by the second indicator value information 118 is an example of the "second indicator value". The second statistical coordinate information 115 is an example of the "second output information".

In the image processing method according to the embodiment, the object Ob has the wall surface W, on which the projection image GP projected from the projector 5 is displayed, and the method further includes correcting the shape of the projection image GP based on the first or second output information.

The computer 1 can thus precisely correct images projected from the projector 5.

2. Variations

The embodiment described above can be changed in a variety of manners. Specific aspects of the changes will be presented below by way of example. Two or more aspects arbitrarily selected from those presented below by way of example may be combined with each other as appropriate to the extent that the selected aspects do not contradict each other. In the variations presented below by way of example, an element providing the same effect and having the same function as the element in the embodiment described above has the same reference character used in the above description, and no detailed description of the same element will be made as appropriate.

2.1. Variation 1

The aforementioned embodiment has been described with reference to the case where the averaging is performed as the statistical processing, but not necessarily in the present disclosure. For example, when N≥3, the averaging may be replaced with acquisition of the median of the X coordinates and the median of the Y coordinates of the points DS contained in the plurality of captured images GS, which are in correspondence with the points DP contained in the projection image GP. The coordinates indicated by the acquired median of the X coordinates and the acquired median of the Y coordinates may be used as the statistical coordinates. That is, the shape of the projection image displayed on the wall surface W with the projection light projected from the projector 5 may be corrected by outputting the statistical coordinate information 113 representing the statistical coordinates.

When N≥3, the averaging may be performed with values that do not fall within an acceptable range excluded. The detection of the values that do not fall within an acceptable range may be based, for example, on the average of the coordinates of the plurality of points DS subjected to the statistical processing and the standard deviation of the coordinates of the plurality of points DS.

The statistical processing method is not limited to the method described above, and a variety of other methods may be used. Information representing the statistical coordinates produced by statistical processing other than the method described above can be output and used for the image correction.

2.2. Variation 2

The aforementioned embodiment and variations thereof have been described with reference to the case where the image display system Sys includes the computer 1, the camera 3, and the projector 5, but not necessarily in the present embodiment. For example, the computer 1 and the projector 5 may be replaced with a projector having the same functions as those of the computer 1 and the projector 5 to further simplify the configuration of the image display system.

What is claimed is:

1. An image processing method comprising:
   acquiring a first captured image that is produced by capturing an image of an object with an imaging device at first time and that contains a first point;
   acquiring a second captured image that is produced by capturing an image of the object with the imaging device at second time different from the first time and that contains a second point corresponding to the first point;
   outputting first output information that is information for correcting a projection image projected by a projector based on at least one of the first and second captured images when a first indicator value generated based on coordinates of the first point in the first captured image and coordinates of the second point in the second captured image is smaller than or equal to a threshold;
   when the first indicator value is greater than the threshold, erasing information representing the coordinates of the first point and information representing the coordinates of the second point;
   acquiring a third captured image that is produced by capturing an image of the object with the imaging device at third time different from the first time and the second time and that contains a fourth point;
   acquiring a fourth captured image that is produced by capturing an image of the object with the imaging device at fourth time different from the first time, the second time, and the third time and that contains a fifth point corresponding to the fourth point, and
   outputting second output information that is information for correcting the projection image based on at least one of the third captured image and the fourth captured image when a second indicator value generated based on coordinates of the fourth point in the third captured image and coordinates of the fifth point in the fourth captured image is smaller than or equal to the threshold.

2. The image processing method according to claim 1, wherein the object has a display surface on which the projection image projected from the projector is displayed,
   the projection image contains a third point corresponding to the first and second points, and
   the first output information represents coordinates of one or more points contained in each of the captured images.

3. The image processing method according to claim 1, wherein the first indicator value is generated based on statistical coordinates produced by statistical processing using the coordinates of the first point and the coordinates of the second point, and the coordinates of the second point.

4. The image processing method according to claim 3, wherein the statistical processing is averaging using the coordinates of the first point and the coordinates of the second point.

5. The image processing method according to claim 1, wherein the object has a display surface on which the projection image projected from the projector is displayed, and
   the method further comprises correcting a shape of the projection image based on the first or second output information.

6. An information processing apparatus comprising a processing apparatus programmed to execute
   acquiring a first captured image that is produced by capturing an image of an object with an imaging device at first time and that contains a first point,
   acquiring a second captured image that is produced by capturing an image of the object with the imaging device at second time different from the first time and that contains a second point corresponding to the first point, and
   outputting first output information that is information for correcting a projection image projected by a projector based on at least one of the first and second captured images when a first indicator value generated based on coordinates of the first point in the first captured image and coordinates of the second point in the second captured image is smaller than or equal to a threshold;

when the first indicator value is greater than the threshold,
erasing information representing the coordinates of the first point and information representing the coordinates of the second point;

acquiring a third captured image that is produced by capturing an image of the object with the imaging device at third time different from the first time and the second time and that contains a fourth point;

acquiring a fourth captured image that is produced by capturing an image of the object with the imaging device at fourth time different from the first time, the second time, and the third time and that contains a fifth point corresponding to the fourth point, and outputting second output information that is information for correcting the projection image based on at least one of the third captured image and the fourth captured image when a second indicator value generated based on coordinates of the fourth point in the third captured image and coordinates of the fifth point in the fourth captured image is smaller than or equal to the threshold.

7. The information processing apparatus according to claim 6,
wherein the object has a display surface on which the projection image projected from the projector is displayed,
the projection image contains a third point corresponding to the first and second points, and
the first output information represents coordinates of one or more points contained in each of the captured images.

8. The information processing apparatus according to claim 6,
wherein the first indicator value is generated based on statistical coordinates produced by statistical processing using the coordinates of the first point and the coordinates of the second point, and the coordinates of the second point.

9. The information processing apparatus according to claim 8,
wherein the statistical processing is averaging using the coordinates of the first point and the coordinates of the second point.

10. The information processing apparatus according to claim 6,
wherein the object has a display surface on which the projection image projected from the projector is displayed, and
the one or more programmable apparatuses are further programmed to correct a shape of the projection image based on the first or second output information.

11. A non-transitory computer-readable storage medium storing a program that causes a processing apparatus to
acquire a first captured image that is produced by capturing an image of an object with an imaging device at first time and that contains a first point,
acquire a second captured image that is produced by capturing an image of the object with the imaging device at second time different from the first time and that contains a second point corresponding to the first point, and output first output information that is information for correcting a projection image projected by a projector based on at least one of the first and second captured images when a first indicator value generated based on coordinates of the first point in the first captured image and coordinates of the second point in the second captured image is smaller than or equal to a threshold;

when the first indicator value is greater than the threshold,
erasing information representing the coordinates of the first point and information representing the coordinates of the second point;

acquiring a third captured image that is produced by capturing an image of the object with the imaging device at third time different from the first time and the second time and that contains a fourth point;

acquiring a fourth captured image that is produced by capturing an image of the object with the imaging device at fourth time different from the first time, the second time, and the third time and that contains a fifth point corresponding to the fourth point, and outputting second output information that is information for correcting the projection image based on at least one of the third captured image and the fourth captured image when a second indicator value generated based on coordinates of the fourth point in the third captured image and coordinates of the fifth point in the fourth captured image is smaller than or equal to the threshold.

12. The non-transitory computer-readable storage medium according to claim 11,
wherein the object has a display surface on which the projection image projected from the projector is displayed,
the projection image contains a third point corresponding to the first and second points, and
the first output information represents coordinates of one or more points contained in each of the captured images.

13. The non-transitory computer-readable storage medium according to claim 11,
wherein the first indicator value is generated based on statistical coordinates produced by statistical processing using the coordinates of the first point and the coordinates of the second point, and the coordinates of the second point.

14. The non-transitory computer-readable storage medium according to claim 13,
wherein the statistical processing is averaging using the coordinates of the first point and the coordinates of the second point.

15. The non-transitory computer-readable storage medium according to claim 11,
wherein the object has a display surface on which the projection image projected from the projector is displayed, and
the one or more programmable apparatuses are further programmed to correct a shape of the projection image based on the first or second output information.

* * * * *